Patented Apr. 30, 1935

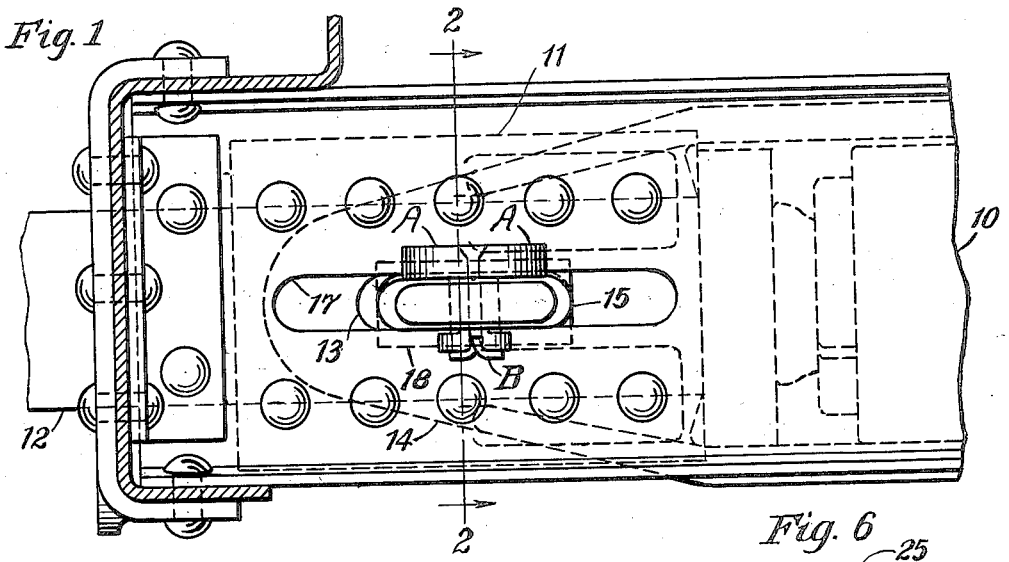
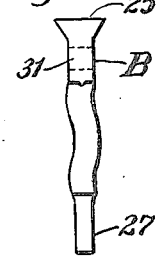
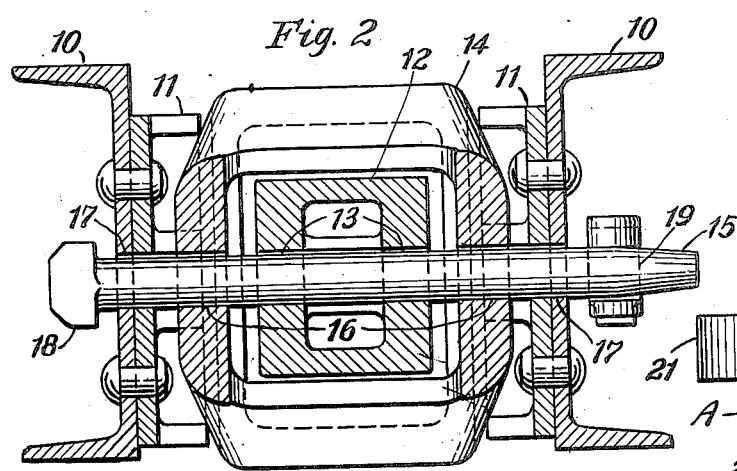
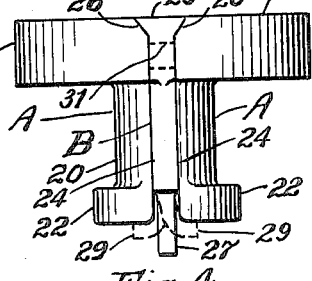
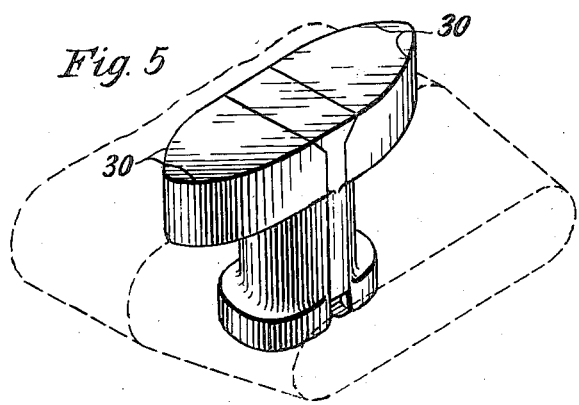
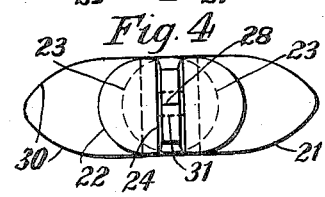

1,999,352

UNITED STATES PATENT OFFICE 1,999,352

KEY RETAINER

Paul P. Barthelemy, St. Paul, Minn.

Application March 11, 1932, Serial No. 598,112

5 Claims. (Cl. 85—6)

This invention relates to improvements in key retainers.

In the operation of railway cars, damage is frequently caused by failure of the coupler key, on account of the key becoming accidentally dislodged and in some cases completely detached because the retaining means does not meet conditions and function properly. One type of coupler key retaining means commonly used, which has been found troublesome because it is not reliable, is in the form of a headed pin having the shank extending through an opening in the end of the key and wherein the retaining means is held in position by a cotter pin or other securing means extending through the shank thereof below the key. This type of retaining means as used has the head elongated transversely of the key and the ends thereof rounded. Due to the unbalanced condition brought about by the elongated head of this type of retainer, combined with the downward taper extending from the pin receiving hole outwardly to the end of the draft key, vibrations of the car cause a decided tendency of the retainer to assume a position wherein the long axis of the head is disposed lengthwise of the key and crowded against the web of the adjacent sill, causing the retainer to be tilted, thereby subjecting the same to bending strains and forcing it upwardly. This action frequently results in stripping off of the head or shearing off of the securing cotter pin thereof and loss of the retainer. Loss of the retainer is also caused by shearing off of the cotter pin through engagement of the cotter with rivet heads projecting from the web of the draft sill.

The main object of my invention is to provide retaining means for coupler keys, which overcome the defects hereinbefore pointed out.

Another object of the invention is to prevent binding of the head of the retainer against the adjacent draft sill by providing the retainer with a head so shaped that contact thereof with the draft sill will tend to rock the head about the vertical axis of the retainer in a direction away from the sill.

A further object of the invention is to prevent turning of the retainer in the opening of the coupler key by providing a tight frictional fit between the shank of the retainer and the walls of the opening in the key.

A still further object of the invention is to provide a retainer for coupler keys having rigid means thereon in shouldered engagement with the key holding the retainer locked to the key.

Other objects of the invention will more clearly appear from the description and claims hereinafter following.

In the drawing, forming a part of this specification, Figure 1 is a longitudinal, vertical sectional view through the underframe structure at one end of a railway car, showing the outer side of one of the center or draft sills in elevation and illustrating my improved coupler key retaining means in connection therewith. Figure 2 is a transverse, vertical sectional view, corresponding substantially to the line 2—2 of Figure 1. Figure 3 is a detailed elevational view, on an enlarged scale, of the improved retaining means shown in Figures 1 and 2. Figure 4 is a bottom plan view of the retaining means shown in Figure 3. Figure 5 is a detailed perspective view of the retaining means, illustrating the same applied to the coupler key, the latter being shown in dotted lines. And Figure 6 is an edge elevational view of a central spreading element employed in connection with my improved retaining means.

In said drawing, 10—10 designate the center or draft sills of a railway car provided with the usual front stop lugs 11—11, which are secured to the vertical webs of the sills by rivets. The shank of the usual coupler is indicated by 12 and has a transverse key slot 13. The coupler shank is connected to the usual yoke 14 by means of the coupler key 15, which extends through slots 16—16 in the yoke and the slot 13 of the coupler shank. The key has its opposite ends working in the usual guide slots 17—17 provided in the draft sills. As clearly shown in Figure 2, the key 15 is of the type having a retaining head 18 at one end and a vertical opening 19 through the other end adapted to receive a detachable retaining element. The opening 19 as shown is of circular cross section.

My improved coupler key retaining means comprises broadly a pair of outer sections A—A and a central filler plate B.

The two sections A—A are of similar design, each comprising a shank portion 20 having top and bottom laterally outwardly projecting flanges 21 and 22. The shank 20 of each section A has a cylindric outer surface 23 which engages the corresponding curved wall section of the opening 19 of the key 15. On the inner side, the shank 20 of each section A is flattened, as indicated at 24, so as to fit squarely on the outer side of the central spacing plate B. The top and bottom flanges 21 and 22 of each section A are spaced apart so that the flanges 21 and 22 will embrace the key 15 on the top and bottom sides. The flanges 21 of the two sections A are of considerably greater thickness and also project a greater distance laterally from the sections than the flanges 22—22. The flanges 22 are of such a size that they will pass through the opening 19 of the key 15 when the spacing plate B is omitted and the sections are inserted in succession. In other words, the flanges 22 are of such a size that after insertion of either of the sections A through the opening 19 and displacement of that section laterally outwardly to an extent that the curved surface of the shank thereof seats on the curved wall of the opening 19, the other section may be inserted in the remaining space provided by the opening 19, the clearance being sufficient to permit free passage of the head 22 of the last named section.

The filler or spacing plate B is of such a size that it fills the space between the two sections A—A and holds the same separated, as shown in Figures 3, 4, and 5, with the flanges 21 and 22 overhanging the key 15 adjacent to the opening 19 and the shank portions 20—20 of the sections A—A fitting the walls of said opening 19. The plate B is preferably of resilient flexible material and is slightly waved or bowed longitudinally, as clearly shown in Figure 6. By providing the waved or bowed arrangement of filler plate, the same when inserted between the sections A—A will yieldingly spread the same apart and press the outer surfaces of the shank sections 20—20 into tight frictional engagement with the corresponding wall portions of the opening 19, thereby holding the retaining element against rotation in said opening. As will be evident, due to the curved structure of the plate B, the sectional retaining element readily accommodates itself to openings in the key, which vary slightly in diameter. At the upper end, the plate B is provided with a tapered head 25, which seats on beveled faces 26—26 provided on the inner sides of the sections A—A. The head 25 prevents downward movement of the plate B with respect to the sections A—A. At the lower end, the plate B is reduced in thickness, as indicated at 27, said reduced portion being split centrally, as indicated at 28, to provide a pair of bendable tangs, which may be bent over in opposite directions, as shown in dotted lines at 29—29 in Figure 3. The angularly bent sections 29—29 serve to hold the plate B against upward displacement with respect to the outer sections A—A of the retaining means.

The flanges 21—21 at the upper ends of the sections A—A and the headed upper end of the plate B together form an elongated head, which has its long axis disposed transversely of the key 15. The flanges 21—21 are cut away at the outer ends along curved lines, as clearly shown in Figures 4 and 5, thereby providing tapered fulcrum sections 30—30 adapted to rock upon the web of the adjacent sill in case of contact of the head of the retainer with said web. The section of the head between the sections 30—30 presents parallel flat side faces, as clearly shown in Figures 4 and 5.

In assembling the retaining element with the key 15, one section A is first applied by inserting the end having the head 22 through the opening 19 and displacing the section outwardly as hereinbefore pointed out. The other section A is then inserted in a similar manner and displaced laterally outwardly in an opposite direction. After the sections have been thus applied, the filler plate B is inserted between the same through the top of the retainer. When the head of the plate B has been seated on the beveled faces of the sections A—A, the tangs at the lower end of the plate B are bent over to provide shouldered engagement between the same and the bottom ends of the sections A—A. As will be evident when the parts have been thus assembled, the sections A—A are held in tight frictional engagement with the walls of the opening 19, and the flanges 21—21 at the top ends and the flanges 22—22 at the bottom ends overhang the key 15 adjacent to the opening 19 so as to provide shouldered engagement between the retaining means and the key and positively prevent endwise removal of the retaining means from the key.

In order to facilitate withdrawal of the member B from between the sections A—A, the former is provided with an opening 31 adjacent to the upper end thereof, within which the end of a lifting tool may be engaged.

As will be evident, in the operation of my improved retaining means there is very little tendency of the retaining means to be rotated about its axis due to the unbalanced condition of the head because of the frictional engagement between the outer sections A—A of the retaining means and the wall of the opening 19. However, in case the retaining means should rotate so as to bring the head thereof to a position where the same will engage the corresponding sill, the tapered arrangement of the end of the head will produce a camming action to return the read to its original position. Inasmuch as the filler member B is protected by being disposed between the sections A—A, there is no danger of this member becoming damaged and disengaged from the other parts. Further, by providing the retaining flanges at the lower ends of the sections A—A of the retaining means, sufficient clearance is at all times provided between the lower end of the retaining means and the projecting rivet heads on the sills to avoid contact between these parts, which would otherwise result in damage.

I have herein shown and described what I now consider the preferred manner of carrying out my invention, but the same is merely illustrative and I contemplate all changes and modifications that come within the scope of the claims appended hereto.

I claim:

1. A retainer for coupler keys, including a pair of outer sections and a central filler section, said outer sections having laterally outwardly projecting flanges at opposite ends forming top and bottom heads, the flanges forming the top head extending laterally in opposite directions and projecting to a greater extent than said bottom flanges, said top flanges being tapered outwardly in opposite directions to provide a transversely elongated head having tapered ends, said end portions of the tapered sections being coincident with the central longitudinal axis of said head.

2. A retainer for coupler keys, including a pair of outer sections and a central filler section between and embraced at opposite sides by said outer sections, said outer sections having said embracing portion thereof corresponding in width to the width of the filler section, said outer sections having a shank portion provided with laterally outwardly projecting flanges at opposite ends forming top and bottom heads, the flanges forming the top head extending laterally in opposite directions and projecting to a greater extent -than said bottom flanges, said top flanges being tapered outwardly in opposite directions to provide a transversely elongated head having tapered ends, said central filler section being in the form of a resilient flexible bowed plate for holding said outer sections yieldingly separated.

3. A sectional retaining element for a draft key which is headed at one end and has an opening through the other end, said retaining element fitting within the opening of the key, said retaining element including outer sections and yielding means between said outer sections for forcing the sections apart into tight frictional engagement with the walls of the opening, said means being embraced throughout its width by said outer sections.

4. In a retaining element for a draft key having an opening adapted to receive said element, the combination with a member having an expansible shank and a transversely elongated head, said shank fitting within the opening of said key; of resilient means embraced at opposite sides by said shank throughout the width of the shank and holding said shank expanded in tight frictional engagement with the walls of said opening.

5. In a retainer for a draft key having a retainer receiving opening at one end, the combination with a pair of outer sections extending through said opening, said sections being headed at opposite ends; of a bowed resilient filler plate therebetween for yieldingly forcing said outer sections apart and into tight frictional engagement with the walls of the opening of the key, said filler plate being of not greater width than said outer sections.

PAUL P. BARTHELEMY.